United States Patent
Huang et al.

(10) Patent No.: US 8,253,750 B1
(45) Date of Patent: Aug. 28, 2012

(54) DIGITAL MEDIA PROCESSOR

(75) Inventors: Jen-Hsun Huang, Los Altos, CA (US); Gerrit A. Slavenburg, Los Altos, CA (US); Stephen D. Lew, Sunnyvale, CA (US); John C. Schafer, Austin, TX (US); Thomas F. Fox, Palo Alto, CA (US); Taner E. Ozcelik, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 12/832,830

(22) Filed: Jul. 8, 2010

Related U.S. Application Data

(63) Continuation of application No. 11/058,743, filed on Feb. 14, 2005, now abandoned.

(60) Provisional application No. 60/544,782, filed on Feb. 14, 2004.

(51) Int. Cl.
  *G06F 13/14* (2006.01)
  *G06F 15/80* (2006.01)
  *G06F 15/00* (2006.01)

(52) U.S. Cl. .............................. 345/519; 345/505; 712/2

(58) Field of Classification Search .................. 345/426, 345/501, 502, 505, 519, 522, 564, 565; 348/567, 348/568, 588; 712/2, 32, 36, 233, 241, 245, 712/247

See application file for complete search history.

(56) References Cited

U.S. PATENT DOCUMENTS

| | | | | |
|---|---|---|---|---|
| 5,079,525 | A * | 1/1992 | Ishikawa et al. | 332/120 |
| 5,153,568 | A * | 10/1992 | Shaw | 345/88 |
| 5,487,022 | A * | 1/1996 | Simpson et al. | 708/205 |
| 5,669,013 | A * | 9/1997 | Watanabe et al. | 710/5 |
| 5,684,534 | A * | 11/1997 | Harney et al. | 375/240.25 |
| 6,167,155 | A * | 12/2000 | Kostrzewski et al. | 382/232 |
| 6,313,838 | B1 * | 11/2001 | Deering | 345/420 |
| 6,490,323 | B1 * | 12/2002 | Shen et al. | 375/240.2 |
| 6,538,656 | B1 * | 3/2003 | Cheung et al. | 345/519 |
| 6,859,236 | B2 * | 2/2005 | Yui | 348/584 |
| 7,109,995 | B2 * | 9/2006 | Skaletzky | 345/506 |
| 7,395,298 | B2 * | 7/2008 | Debes et al. | 708/603 |
| 2002/0163521 | A1 * | 11/2002 | Ellenby et al. | 345/502 |
| 2004/0041813 | A1 * | 3/2004 | Kim | 345/519 |
| 2005/0105007 | A1 * | 5/2005 | Christian | 348/731 |
| 2005/0140695 | A1 * | 6/2005 | Dunton et al. | 345/629 |

* cited by examiner

*Primary Examiner* — Joni Hsu
(74) *Attorney, Agent, or Firm* — Kilpatrick Townsend & Stockton LLP

(57) ABSTRACT

Circuits, methods, and apparatus that provide highly integrated digital media processors for digital consumer electronics applications. These digital media processors are capable of performing the parallel processing of multiple format audio, video, and graphics signals. In one embodiment, audio and video signals may be received from a variety of input devices or appliances, such as antennas, VCRs, DVDs, and networked devices such as camcorders and modems, while output audio and video signals may be provided to output devices such as televisions, monitors, and networked devices such as printers and networked video recorders. Another embodiment of the present invention interfaces with a variety of devices such as navigation, entertainment, safety, memory, and networking devices. This embodiment can also be configured for use in a digital TV, set-top box, or home server. In this configuration, video and audio streams may be received from a number of cable, satellite, Internet, and consumer devices.

5 Claims, 10 Drawing Sheets

DIGITAL MEDIA PROCESSOR

CROSS-REFERENCE TO RELATED APPLICATIONS

This application is a continuation of U.S. patent application Ser. No. 11/058,743, filed on Feb. 14, 2005, titled "DIGITAL MEDIA PROCESSOR," and U.S. provisional application No. 60/544,782, filed Feb. 14, 2004, which are incorporated by reference.

BACKGROUND

The present invention relates generally to digital media processors (DMPs), and more particularly to DMPs for use in television, consumer video devices, entertainment, and navigation systems.

At present, the digital media landscape is a scattered and fractured one. In the home, the realm of computers, camcorders, and LCD monitors is balkanized from that of televisions, video recorders, and set-top boxes. Users take pictures with their digital cameras, but instead of sharing them with friends on the television in the comfort of the living room, a trip to the den is required, where they are shown on the computer. Similarly, an entertaining show broadcast on cable is missed, and the DVD recorder sitting idle in the computer cannot be called on for assistance.

One solution has been to encourage the migration of the personal computer to the living room, where by its proximity, it may become more useful as a home entertainment device. But not everyone likes to have the personal computer in such a public space; the bedroom, den, or home office seems to be preferred.

Meanwhile, the number and variety of audio and video input sources has increased greatly, with the proliferation of cable and satellite, DVDs, VCRs, camcorders, and the like.

Similarly, the number and variety of output devices has increased, with plasma televisions being but one example.

Similarly, the number and sophistication of the electronics in our automobiles is advancing rapidly. Car navigation systems are becoming commonplace, and video games and DVD players help keep the kids and adult passengers entertained for both long trips and short jaunts around town.

Accordingly, what is needed is a unifying device or group of devices that can bridge the gaps between computers, navigation, and entertainment. Preferably it would be a highly integrated device capable of receiving and providing audio and video signals in several formats. Also, it would be preferable that it be able process data streams using multiple formats simultaneously.

SUMMARY

Accordingly, embodiments of the present invention provide a highly integrated digital media processor. The digital media processor is capable of performing parallel processing of multiple format audio and video signals. The audio and video signals may be received from a variety of input devices or appliances, such as antennas, VCRs, DVDs, satellite, cable, or network set-top boxes, and the like, as well as networked devices such as camcorders and modems. The digital media processor may provide output audio and video signals to output devices or appliances such as televisions, monitors, and the like, as well as peripheral and networked devices such as printers and networked video recorders. Another embodiment of the present invention interfaces with a variety of devices such as navigation, entertainment, safety, memory, and networking devices. This embodiment can also be configured for use in a digital TV, set-top box, or home server. In this configuration, video and audio streams may be received from a number of cable, satellite, Internet, and consumer devices such as DVD players, and outputs may be displayed on one or more of a variety of monitors, televisions, and other display devices.

A better understanding of the nature and advantages of the present invention may be gained with reference to the following detailed description and the accompanying drawings.

DESCRIPTION OF SPECIFIC EMBODIMENTS

Figure 1:
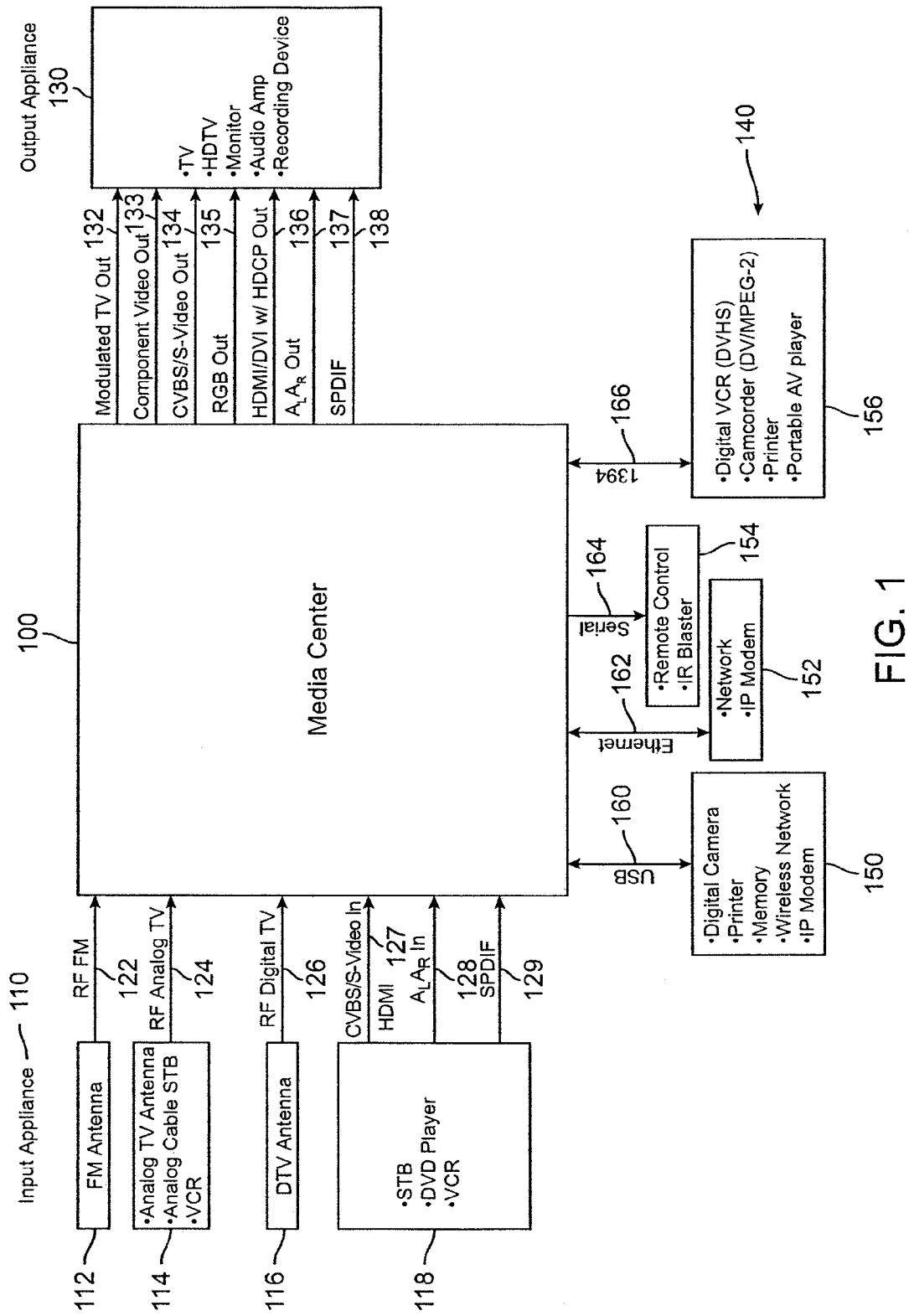
FIG. 1 is a block diagram of a media center system consistent with an embodiment of the present invention.

FIG. 1 is a block diagram of a media center system consistent with an embodiment of the present invention. This block diagram includes a media center 100, input appliances 110, output appliances 130, and peripheral and network devices 140. This figure, as with all the included figures, is shown for illustrative purposes only and does not limit either the embodiments of the present invention or the claims.

The media center 100 may be a personal computer or other type of device. In a specific embodiment of the present invention, the media center 100 includes a Digital Media Processor (DMP) integrated circuit along with a number of supporting integrated circuits. In the particular embodiment illustrated here, a number of input appliances 110 are shown, though in other embodiments, more, fewer, or other devices may be connected or in communication with the media center 100. Similarly, in this embodiment, a number of output appliances 130 and peripheral and network devices 140 are shown, though in other embodiments more, fewer, or other devices may be included. For example, one or more devices may be in communication with the media center 100 over a wireless link such as a WiFi, 802.11a, b, or g, or 802.15.3a link. These principles apply to the other specific embodiments shown herein.

In this particular example, the input appliances 110 include an FM antenna 112 providing an RF FM signal to the media center 100, and analog TV sources 114 including an analog TV signal, analog cable set-top box, and videocassette recorder providing an analog RF signal. Also included are a digital TV antenna 116, and a set-top box, DVD player, and videocassette recorder 118, which may provide a composite video, S-Video 127, component video or HDMI 127, audio $A_L A_R$ 128, or SPDIF (Sony/Philips digital interface) signal 129 to the media center 100.

Also in this example, a number of output appliances 130 are shown including a television, high-definition television, monitor, audio amplifier, and recording devices such as a VCR or digital video recorder. These devices may be driven over one or more types of signals including modulated TV output 132, component video output 133, S video output 134, RGB output 135, HDMI/DVI output 136, $A_L A_R$ output 137, or SPDIF signal 138.

A number of peripheral and network devices 140 are shown in communication with the media center 100. These devices include peripheral devices that are attached or in communication with the media center 100 using one or more standard interfaces, and network devices utilizing one or more of a number of networking standards. Included are a digital camera, printer, memory, wireless network, or IP modem 150 communicating over a USB or USB2 bus 160, a network or IP modem 152 communicating over an Ethernet connection 162, and a remote control or IR blaster 154 communicating over a serial bus 164. Also included are a digital VCR, camcorder, printer, or portable audio video player communicating with the media center 100 over a FireWire™ connection 166. Alternately, one or more or other device may be in communication with media center 100 over a wireless connection.

One or more of these devices may be incorporated into the DMP itself. Alternately, one or more of these devices may include an embodiment of the present invention. For example, an embodiment of the present invention may be used to improve the functionality and other aspects of the included set-top box. Alternately, the functionality of the set-top box may be included in the DMP of the Media Center.

Various embodiments of the present invention may utilize one of a number of operating systems. For example, a specific embodiment of the present invention is capable of operating using one or more of the Windows™ operating systems such as Windows XP. Other embodiments use a version of the Linux operating system, for example, Forceware, available from NVIDIA Corporation in Santa Clara, Calif.

This specific example, Forceware, provides audio and video codecs, navigators (for DVD, for example), streaming, platform independent modules, Microsoft™ Windows Directshow, and Linux, Windows, and handheld specific applications.

Figure 2:
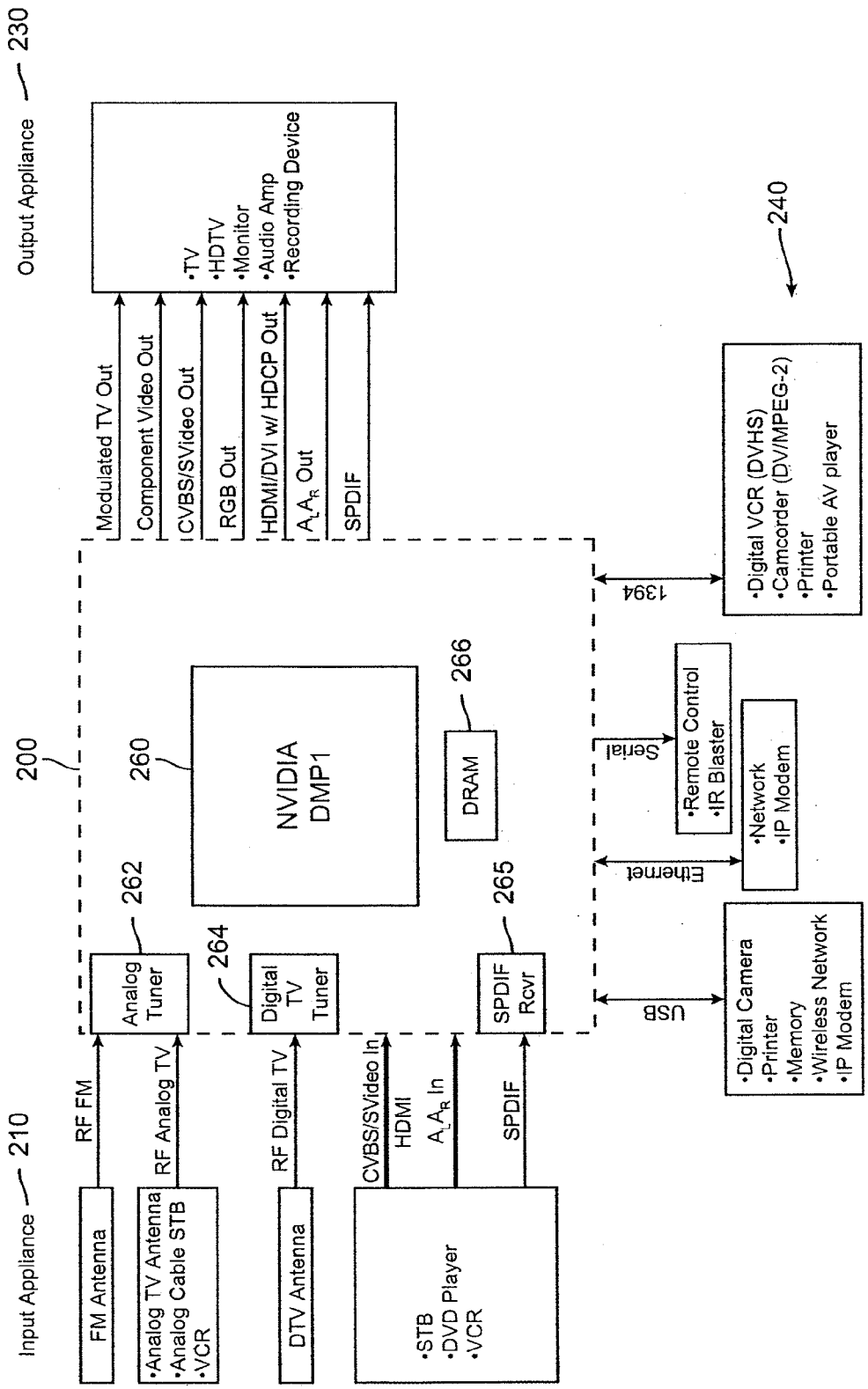
FIG. 2 is a more detailed block diagram of a media center system consistent with an embodiment of the present invention.

FIG. 2 is a more detailed block diagram of a media center system consistent with an embodiment of the present invention. This block diagram includes a media center 200, input appliances 210, output appliances 230, and peripheral and network devices 240. The media center 200 includes a digital media processor 260. In a specific embodiment, this processor is formed on an integrated circuit. Alternately, this processor may be formed on more than one integrated circuit. Also included in the media center 200 are a number of supporting circuits including an analog tuner 262, a digital TV tuner 264, SPDIF receiver 265, a DRAM or other memory device or devices 266. In various embodiments, one or more of these supporting circuits may be absent, or other supporting circuits may be included.

As can be seen, inputs from a wide variety of sources may be received by a digital media processor, and outputs provided to a wide variety of devices. A target performance may be described as any format video and audio signal in, and any format video and audio signal out.

In this way, the gap between computers and home entertainment can be closed. For example, this system may be used to move broadband content that would typically be viewed on a computer to a television. Similarly, content on a disk drive can be viewed on a plasma television in the living room. Finally, the capability of new digital displays can be more fully utilized.

Figure 3:
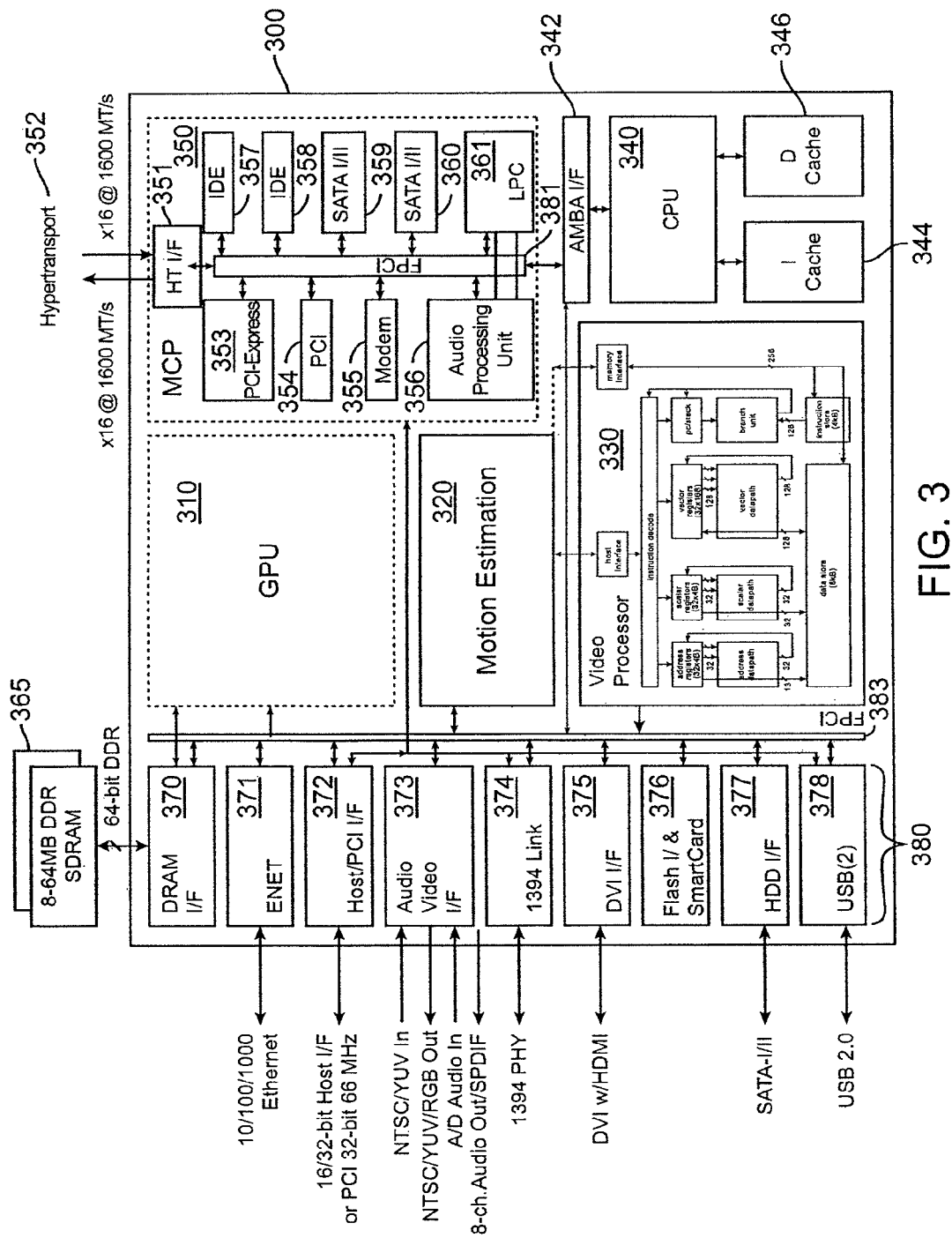
FIG. 3 is a block diagram of a digital media processor that is consistent with an embodiment of the present invention.

FIG. 3 is an exemplary block diagram of a digital media processor 300 that is consistent with an embodiment of the present invention. This digital media processor 300 includes a graphics processing unit (GPU) 310, motion estimation circuit 320, video processor 330, central processing unit 340, media and communications processor 350, and a number of networking and peripheral device interfaces 380. The digital media processor 300 is connected to one or more memory devices 365.

The graphics processing unit 310, as with the graphics processing units in the other figures, may be a GeForce™ FX graphics processing unit, or other integrated graphics processing unit. Alternately, the graphics processing unit may be external to the digital media processor 300. The graphics processing unit is typically capable of rendering 3-dimensional images, and is often a programmable processing unit.

The GPUs included in these examples typically include a graphics pipeline that further includes a number of circuits optimized for generating graphics images. These circuits may include geometry engines, rasterizers, shaders (which may be programmable), texture filters, raster operations circuits, vertex processors, scanout circuits, memory interface circuits, and other graphics and support circuits. In various embodiments of the present invention, more than one GPU may be included. Also, some or all the function of the GPU may be performed by a more general purpose processing unit, or by circuitry that includes both general processing circuits and some specialized graphics functions.

A motion estimation circuit 320 is connected to the system bus (FPCI) and video processor 330. The media and communications processor (MCP) 350 includes a HyperTransport™ interface 351, PCI express interface 353, PCI interface 354, modem 355, audio processing unit 356, IDE interfaces 357 and 358, SATA-I/II interfaces 359 and 360, and LPC 361. The MCP 350 further includes an FPCI bus 381. In various embodiments of the present invention, this bus may be the same bus as FPCI bus 383, or it may be a second bus.

The central processing unit 340 includes an interface circuit 342, instruction cache 344, and data cache 346. In a specific embodiment of the present invention, an ARM CPU 340 is used. Specifically, in various embodiments, an ARM11 processor core available from ARM Holdings PLC in Cambridge, England, is integrated in the DMP. In other embodiments, the processor may be external to the DMP. For example, processors such as those provided by Advanced Micro Devices, Inc. of Sunnyvale, Calif., or Intel Corporation of Santa Clara, Calif. may be used. In other embodiments of the present invention, these or other processing units may be used, and they may be on or off-chip, that is, they may be external or integrated on the DMP device.

In this specific example, a number of network and external device interfaces are shown. In this and other embodiments of the present invention, more, fewer, or other interfaces may be included. Specifically, a DRAM interface 370 communicates with a memory 365. In this specific example, a number (specifically 8) of double-data-rate (DDR) SDRAM devices are shown, though other numbers and other types of memory devices may be used. An Ethernet connection 371 is also provided. This Ethernet connection may be 10, 100, or 1000 base compatible. A host/PCI interface 372 is also provided.

An audio video interface 373 is also included, as is a FireWire link 374. A DVI interface 375 is also shown, and a wireless interface may be included. A flash or smartcard interface 376 is also included, as is a hard disk drive interface 377. USB port 378 may be USB and USB2 compatible.

This and similar devices may be used as a media center, media node or extender, or in other applications, such as personal digital assistants, networked digital video recorders, vpods, and the like. For example, one embodiment of the present invention is particularly suited for use in a car navigation and entertainment system.

Figure 4:
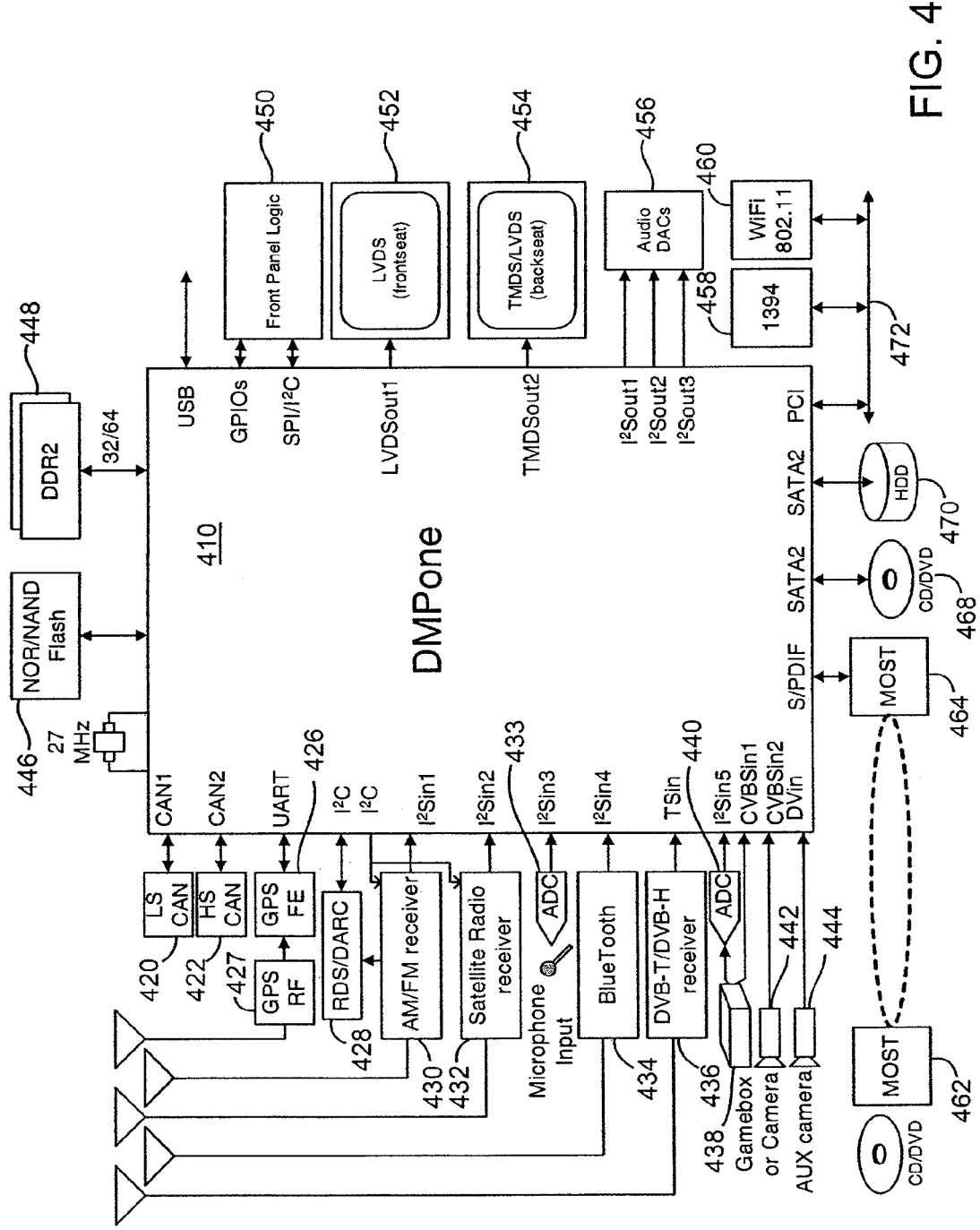
FIG. 4 is a block diagram of a car navigation and entertainment system consistent with an embodiment of the present invention.

FIG. 4 is a block diagram of one such car navigation and entertainment system that is consistent with an embodiment of the present invention. This block diagram includes a DMP 410 communicating with a variety of navigation, entertainment, safety, memory, and networking devices. One or more of these devices may be controlled via the front panel logic interface 450.

Navigation devices include a global positioning system (GPS) radio 424 and GPS front end 426 that receives GPS information and provides it to the DMP 410. The DMP 410 processes the GPS information and provides it on front seat display 452, and if selected, on back seat display 454. The GPS information may be processed as flat, map-like images. Alternately, the GPS information may be rendered with graphic information resulting in a more lifelike and pleasing 3 dimensional image. Map and other information may be stored on a hard drive 470, CD or DVD 468, or in either of the memories 446 or 448. Visual information from one or both of the cameras 442 and 444 may be added to the displayed GPS information.

Entertainment devices include an AM and FM radio receiver 430, satellite radio receiver 432, satellite video receiver (not shown), digital video broadcast receiver 436, game box or game consol 438, and DVD player 468. These systems may couple directly to the DMP 410 directly, or through a network such as media oriented systems transport (MOST) network 462-464.

Safety devices include cameras 442 and 444. These cameras may be used to provide rear-view images useful while backing up. Alternately, one or both may be forward-facing. This may particularly be useful if a camera includes night vision functionality. Also, such a forward-facing image may be included with GPS information. These images are typically displayed using the front seat display 452.

The memory devices include a hard drive 470, various optical storage media such as CD, DVD 468, flash 446, and DRAMs 448. These may store configuration data, music, videos, maps, and other information.

Networking devices include high-speed and low-speed controller area network (CAN) devices 420 and 422, IEEE 1394 458 and IEEE 802.11 460 physical interfaces, commonly known as FireWire and WiFi interfaces, and Ethernet or LAN interfaces (not shown). One or more of these interfaces may communicate with the DMP 410 directly or via a PCI or PCI-Express bus 472.

It will be appreciated by one skilled in the art that other variations on this system are possible. For example, one or more of the groups of devices, namely navigation, entertainment, safety, memory, and networking devices, may be omitted and others may be included. Further, in each group, one or more shown devices may be omitted and others may be included.

Figure 5:
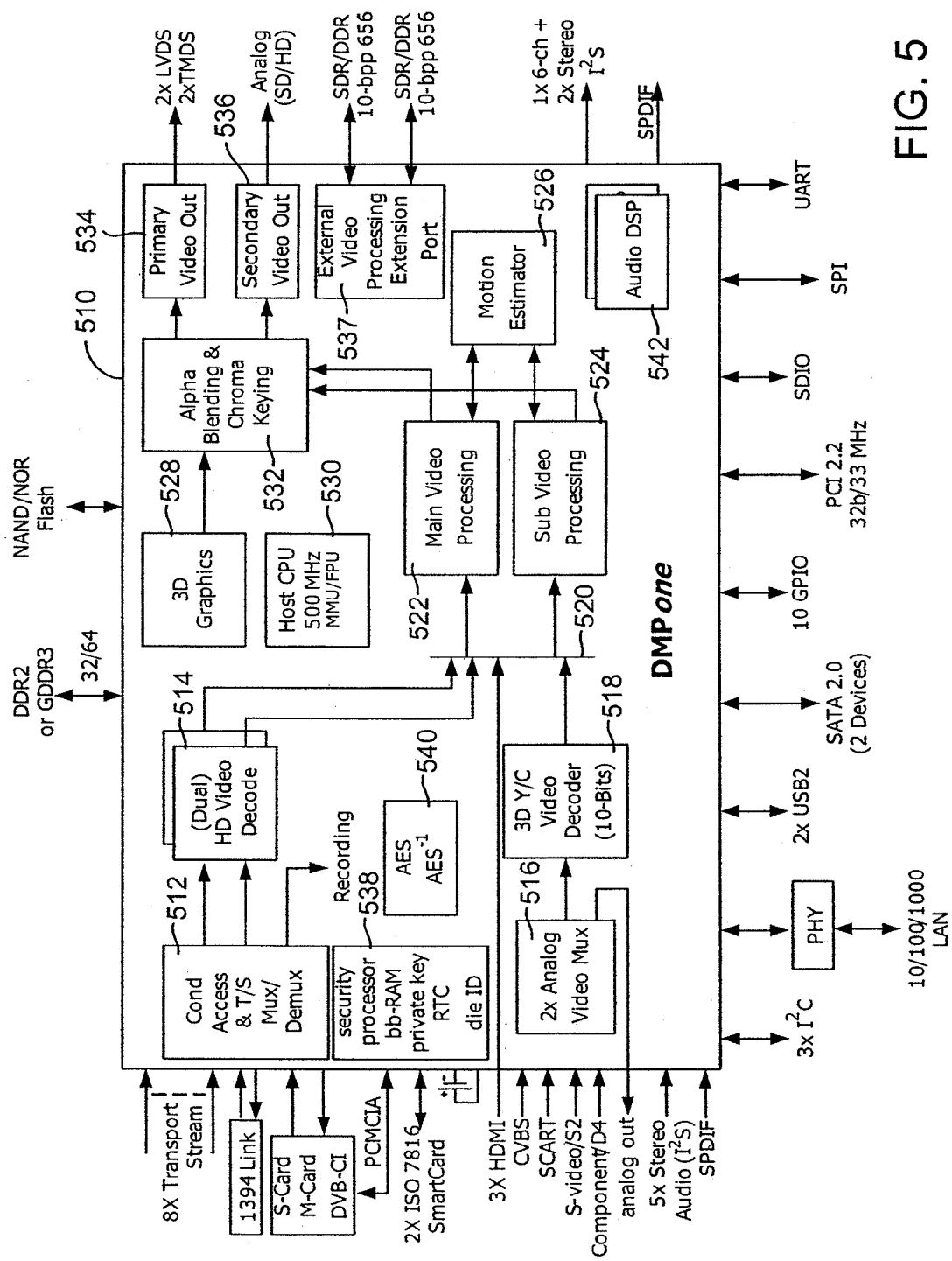
FIG. 5 is another exemplary block diagram of a DMP that is consistent with an embodiment of the present invention.

FIG. 5 is another exemplary block diagram of a DMP that is consistent with an embodiment of the present invention. This block diagram includes digital and analog input paths that are multiplexed and received by a video processing circuit. The video processing circuits provides outputs that are mixed with outputs from a 3-dimensional graphics processing unit and provided to television display units and television monitors. This block diagram also includes audio, encryption, and other circuits.

The digital input path includes a digital signal path including multiplexer circuitry 512 and high-definition video decoder 514 and an analog signal path including analog video multiplexer 516 and video decoder 518. The outputs of the analog and digital paths are multiplexed by multiplexer 520 and provided to a video processing circuit.

The video processing sub-circuit includes a main video processing sub-circuit 522, a second or sub video processing sub-circuit 524, and motion estimator 526. Outputs from the video processing sub-circuits 522 and 524 are received along with outputs from the programmable 3-dimensional graphics processing unit 528 by the alpha blending and chroma keying circuit 532. The alpha blending and chroma keying circuit 532 provides outputs to the primary video out circuit 534 and secondary video out circuit 536. The primary video out circuit 534 and the secondary video out circuit 536 typically provide outputs to television display units and television monitors. An external video processing extension port 537 is also included.

Security circuitry 538 provides security, a private key, and die information, and works in conjunction with conditional access circuit 512 and encryption and decryption unit 540. An audio processor 542 is also included.

Figure 6:
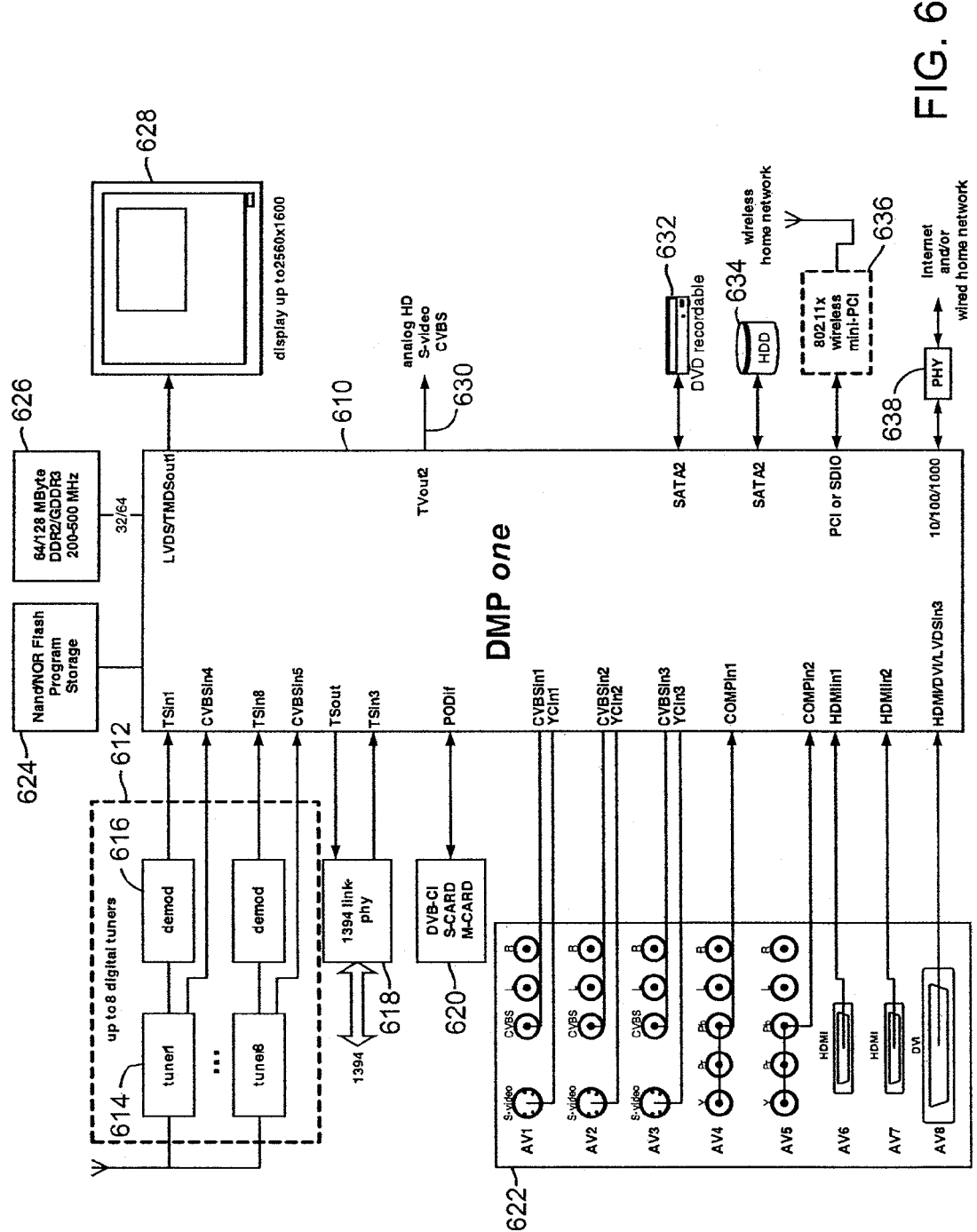
FIG. 6 is a block diagram of a networked television set centered around a digital media processor that is consistent with an embodiment of the present invention.

FIG. 6 is a block diagram of a networked television set that incorporates a digital media processor that is consistent with an embodiment of the present invention. This figure includes a digital media processor 610 that receives inputs from a number of sources, such as broadcast, cable, satellite, and the Internet, and provides outputs to the display portion of the television set, recording media, and home networks.

Input sources include a number of digital tuners 612 with each including a tuner front end 614 followed by a demodulator 616. In this is specific example, up to 8 digital tuners are shown, though various embodiments may accept inputs from more or fewer tuners. Broadcast signals may be received in a digital format via the digital video broadcast card 620, or via an analog tuner (not shown). Internet video and audio may be received via wireless interface 636 or wired interface 638. Other input sources included an IEEE 1394 (FireWire) link 618, hard drive 634, and DVD drive 632.

In this example, images and audio generated by the DMP 610 may be viewed and heard with a number of various devices that may be included in a unit that further houses the DMP 610 or is separate from the DMP 610. Examples include, a display 628, remote television that is configured to function as a display (not shown), or other device. Output signals may also be sent elsewhere via wired 638 or wireless connections 636. They may also be stored on a hard drive 634, an optical drive such as DVD recorder 632, or memories 624 or 626.

Configuration and other information may be stored in flash memory 624. Other information may be stored in DRAMs 626, for example, pixel and other graphic data generated by a graphics processing unit incorporated on the DMP 610.

Figure 7:
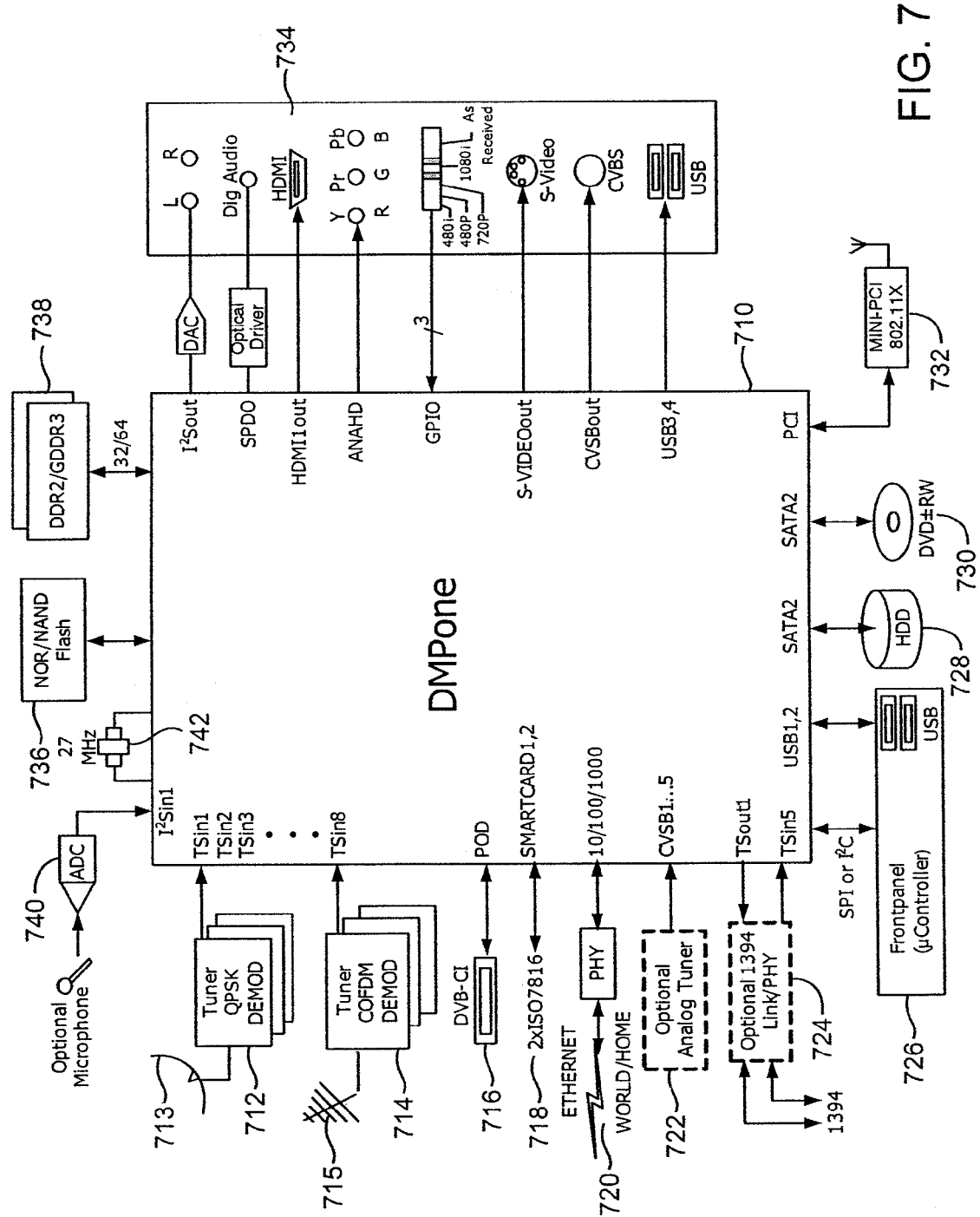
FIG. 7 is another block diagram of a home entertainment server centered around a digital media processor that is consistent with an embodiment of the present invention.

FIG. 7 is another block diagram of a home entertainment server centered around a digital media processor that is consistent with an embodiment of the present invention. This figure includes a digital media processor 710 that receives inputs from a member of sources, such as broadcast, cable, satellite, and the Internet, and provides to puts to displays, the television sets, recording media, and home networks. In this example, various functions and configurations of the DMP are controlled via a front panel 726.

Input sources include a number of digital tuners and demodulators 712 through 714. As before, in this is specific example, up to 8 digital tuners are shown, though various embodiments may accept inputs from more or fewer tuners. The tuners may receive signals from satellite antennas 713, broadcast antennas 715, or other sources. Other broadcast signals may be received via one or more analog tuners 722. Received broadcasts may be decrypted by a POD device such as a DVB-CI card 716. Internet video and audio may be received via wired or wireless connections 720 and 732. Other input sources included an IEEE 1394 (FireWire) link 724, hard drive 728, DVD drive 730, and microphone 740.

In this example, images and audio generated by the DMP 710 may be viewed with a number of various devices. Examples include, a monitor or television (not shown), or other device connected via one of the many connectors 734. Output signals may also be sent elsewhere via wired or wireless connections 720. They may also be stored on the hard drive 728, an optical drive such as DVD recorder 730, or memories 736 or 738.

Configuration and other information may be stored in the flash memory 736. Other information may be stored in DRAMs 738, for example, pixel and other graphic data generated by a graphics processing unit incorporated on the DMP 710.

Figure 8:
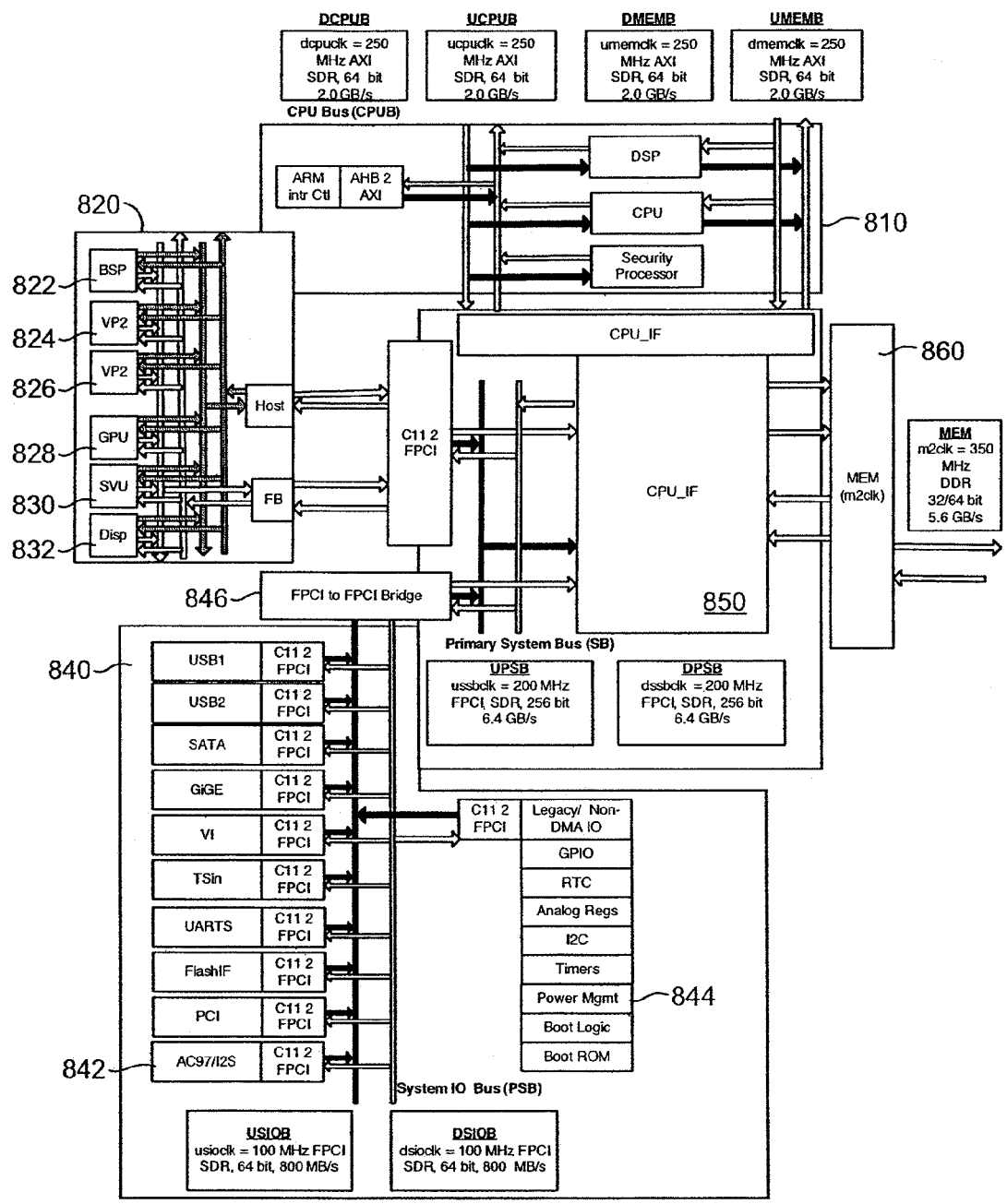
FIG. 8 is another exemplary block diagram of a DMP that is consistent with an embodiment of the present invention.

FIG. 8 is another exemplary block diagram of a DMP that is consistent with an embodiment of the present invention. This block diagram includes and embedded processor portion 810, in video and graphics processing circuitry 820, input and output circuits 840, embedded devices 844, and interface circuits 850. Typically in this circuitry resides on one integrated circuit, though portions may reside on one or more or separate integrated circuits. A memory controller 860 is included connecting to one or more separate memory integrated circuits (not shown).

The embedded processor circuitry 810 includes a CPU, digital signal processor, and security processing circuits. The video and graphics circuitry 820 includes a bit stream processor block 822, a first video processing circuit 824, a second video processing circuit 826, programmable graphics processing unit 828, streaming vector unit 830, and display circuit 832.

A number of interface circuits 842 are also included, such as USB, hard drive, flash, and PCI or PCI express interface circuits. Also included on this integrated circuit are a number of embedded devices 844 including a boot ROM and boot logic circuit for start-up configuration, timers, power management circuits, and the like.

Figure 9:
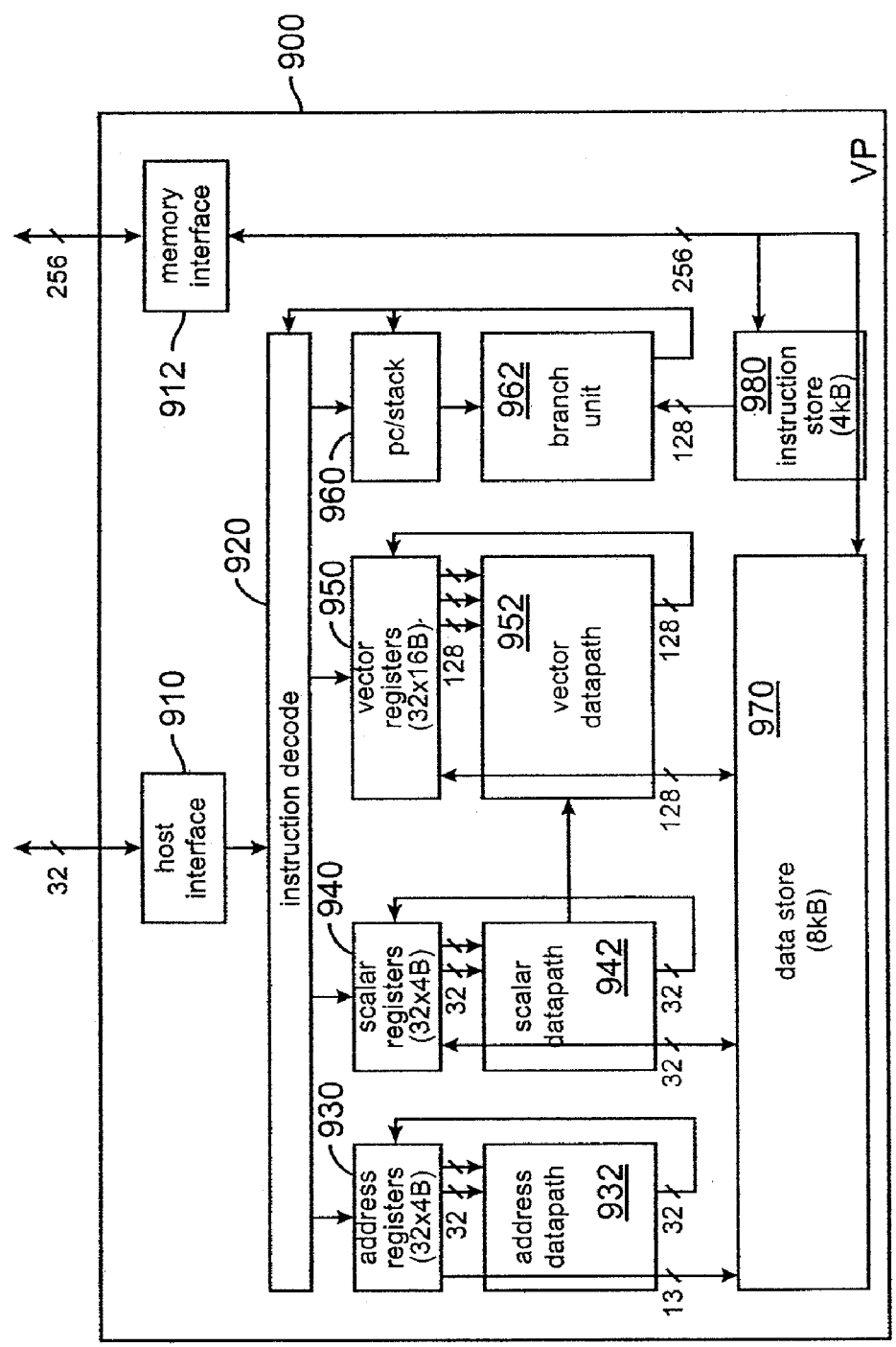
FIG. 9 is a block diagram of a video processor that may be used as the video processors in the above figures, or as a video processor in other embodiments of the present invention.

FIG. 9 is a block diagram of a video processor that may be used as the video processor 340 in FIG. 3, or as a video processor in other embodiments of the present invention. This block diagram includes a host interface 910, memory interface 912, instruction decode 920, address circuitry including address registers 930 and address datapath 932, scaler circuitry including scaler registers 940 and a scaler datapath 942, vector circuitry including vector registers 950 and a vector datapath 952, and instruction circuits including a PC stack 960, branch unit 962, and instruction store 980, as well as a data store 970. This circuit utilizes a SIMD (single instructions, multiple data) architecture that provides a multi-format multi-stream CODEC (coder-decoder). An exemplary embodiment provides a video processor capable of operating at 100 GOPS at a 500 MHz clock rate.

This video processor is capable of compressing and decompressing video signals using one of several standards. For example, signals may be compressed and decompressed using H.264, WMV9 (Windows™ media video 9), MPEG 2 and 4, DiVX, or other standards. Further, signals may be transcoded from one format to another.

In some embodiments, this high degree of flexibility is achieved by making this video processor programmable. This provides a configurable processor that may simultaneously handle different operations on different data streams using different formats. Various embodiments also handle both integer and floating point data types.

Some video processors consistent with embodiments of the present invention are capable of performing parallel processing of multiple format audio and video signals. Similarly, some video processors consistent with embodiments of the present invention are able to encode or compress multiple video streams simultaneously.

In many applications a complete media center is not needed. For example, a user may decide that it is undesirable to have a media center in her living room, even though the television is located there. In such as case, the media server may be moved to a less central location, for example, an office, wiring closet, or other location. Meanwhile, televisions, monitors, and other devices may be located not just in the living room, but in other rooms as well. Accordingly, a device that capable of receiving a signal from the media center (or in this case a media server) and providing signals to these televisions, monitors, or other devices is useful. Such a device may be referred to as a media node or media extender.

Figure 10:
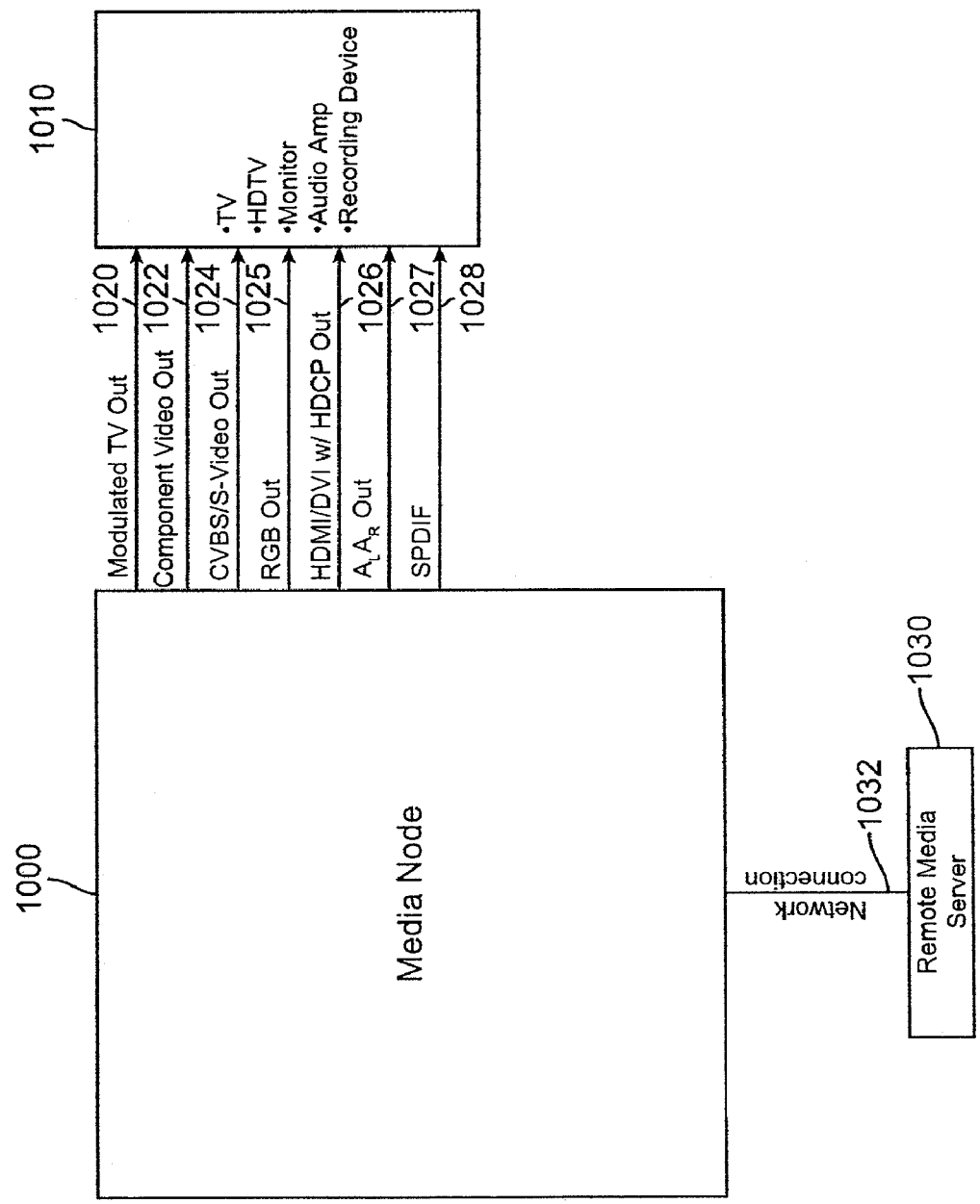
FIG. 10 is a block diagram of a portion of an electronic system consistent with an embodiment of the present invention.

FIG. 10 is a block diagram of a portion of an electronic system consistent with an embodiment of the present invention including a media node 1000, output appliances 1010, and a remote media server 1030. The media server may be a media center at a first or remote location, while the media node and output appliance 1010 is at a second location. The media server 1030 communicates with the media node 1000 over a network or similar connection 1032. In a specific embodiment, the network connection 1032 is a wireless connection, such as a WiFi, 802.11a, b, or g, or 802.15.3a connection, or any other connection that may support TCP/IP or similar protocol.

In various embodiments, the media node 1000 may simply receive compressed video data from the remote media server 1030. This compressed video may be encoded using H.264, WMV9, or other compression standard. In this case, the media node receives compressed data over a TCP/IP connection, and provides one or more consumer electronic audio video standard signals to an output device.

In other embodiments, the media node 1000 may further compress received video signals and provide them to a remote media server 1030, or other device, such as a digital video disk (DVD) recorder. Optionally, the media node 1000 may receive video signals in a first format, decompress them, compress them in a second format (that is, they may be transcoded), and provide them to a remote recording device.

In this specific example, output appliances 1010 include a television, high-definition television, monitor, audio amplifier, and recording devices such as a VCR or digital video recorder. These devices may be driven over one or more types of signals including modulated TV output 1020, component video output 1022, S video output 1024, RGB output 1025, HDMI/DVI output 1026, $A_L A_R$ output 1027, or SPDIF signal 1028.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An integrated circuit comprising:
a first input for receiving an FM signal;
a second input for receiving an analog television signal;
a third input for receiving a digital television signal;
a fourth input for receiving an HDMI signal;
a first bus port for a Universal Serial Bus interface;
a second bus port for an Ethernet interface;
a first output for a modulated television signal;
a second output for a component video signal; and
a third output for an HDMI output.

2. The integrated circuit of claim 1 further comprising:
a third bus port for a serial bus.

3. The integrated circuit of claim 2 further comprising:
a fourth bus port for an IEEE 1394 interface.

4. The integrated circuit of claim 3 further comprising:
a fourth output for a VGA output.

5. An integrated circuit comprising:
a graphics processing unit;
a video processor;
a motion estimator coupled to the video processor;
a central processing unit;
a cache coupled to the central processing unit,
a memory interface;
an Ethernet interface;
an audio input;
a USB interface; and
an HDMI interface,
wherein the video processor further comprises:
 an address data path;
 a scalar data path;
 a vector data path;
 address registers coupled to the address data path;
 scalar registers coupled to the scalar data path;
 vector registers coupled to the vector data path;
 a host interface;
 an instruction decode coupled to the host interface, the address registers, the scalar registers, and the vector registers;
 a program counter stack coupled to the instruction decode;
 a branch unit coupled to the program counter stack;
 an instruction store coupled to the branch unit; and
 a data store coupled to the address registers, the scalar registers, and the vector registers.

* * * * *